US006182878B1

United States Patent
Racca

(10) Patent No.: US 6,182,878 B1
(45) Date of Patent: Feb. 6, 2001

(54) CARRIER FOR CELLULAR PHONE

(76) Inventor: Enrico Racca, 10315 SW. 114 Ct., Miami, FL (US) 33176

( * ) Notice: Under 35 U.S.C. 154(b), the term of this patent shall be extended for 0 days.

(21) Appl. No.: 09/587,051

(22) Filed: Jun. 2, 2000

(51) Int. Cl.[7] ................................................. A45C 13/30
(52) U.S. Cl. ........................ 224/605; 224/604; 224/623; 224/236; 224/901.4; 224/901.6; 224/930
(58) Field of Search ........................................ 224/604, 605, 224/623, 236, 240, 901.2, 901.4, 901.6, 901.8, 930

(56) References Cited

U.S. PATENT DOCUMENTS

| D. 284,372 | 6/1986 | Carpenter . | |
|---|---|---|---|
| 4,164,308 | 8/1979 | Gautier . | |
| 4,771,927 | 9/1988 | Ventura . | |
| 4,896,805 | 1/1990 | Klaczak et al. . | |
| 5,009,346 | * 4/1991 | Butler | 224/605 |
| 5,318,084 | 6/1994 | Jackson . | |
| 5,354,131 | 10/1994 | Mogil . | |
| 5,526,924 | * 6/1996 | Klutznick | 206/5 |
| 5,570,824 | 11/1996 | Lyon et al. . | |
| 5,586,704 | * 12/1996 | Alexander et al. | 224/605 |
| 5,644,785 | 7/1997 | Garrett . | |
| 5,653,336 | 8/1997 | Buonaiuto et al. . | |
| 5,653,367 | * 8/1997 | Abramson | 224/624 X |
| 5,711,469 | 1/1998 | Gormley et al. . | |
| 5,915,609 | 1/1999 | Diakoulas . | |
| 5,957,357 | 9/1999 | Kallman . | |

* cited by examiner

Primary Examiner—Stephen K. Cronin
(74) Attorney, Agent, or Firm—Hoffman, Wasson & Gitler, PC

(57) ABSTRACT

A versatile carrier for cellular phones or the like, comprising an upwardly opening receptacle, with an expandable side panel, for receiving phones of different sizes and shapes. An elongated locking tongue, with a resealable fastening strap, extends over the open end of the body of the carrier and retains the phone therein. A closure flap is secured to the rear panel of the receptacle, and can be pivoted relative thereto. At least one resealable fastening strip is secured to the underside of the closure flap. Complementary fastening strips are located on the back panel of the body of the carrier and on the adjacent side panel for cooperation with the closure flap. The closure flap is pivoted so that the fastening strips on the flap securely engages the complementary strips on the rear panel and the side panel, so that the carrier may be secured to a suspender strap, handbag strap, etc. in a vertical or horizontal orientation. The complementary fastening strips are situated to accommodate straps, of different widths, thus increasing the ability of the carrier to function satisfactorily with belts, suspender straps, luggage straps, handbags, etc.

6 Claims, 6 Drawing Sheets

CARRIER FOR CELLULAR PHONE

BACKGROUND OF THE INVENTION

1. Field of the Invention

The invention pertains generally to carrying devices for portable phones, pagers, and similar appliances, and more particularly to a carrier that is adapted to retain a cellular phone in a readily accessible position on the body of the user.

2. Prior Art

In order to insure that a cellular phone is readily accessible to receive in-coming calls, and to place out-going calls that maximize the effectiveness of the phone, the user frequently carries the phone on his, or her, person, in a purse, pocket or briefcase. However, in order to respond to an incoming call, the user has to locate, and extract, the phone from its normal resting place before the in-coming call is terminated.

Consequently, pouches, holsters, "fanny-packs", and other holders worn about the waist of the cell phone user became widespread in usage. Other holders are clipped to the belt of the wearer.

As cellular phones diminished in size and weight, and were manufactured in an array of eye-catching colors, smaller carriers that might be secured to the strap of a woman's hand bag, shoulder bag, or back pack, were envisioned. The smaller carriers might also be secured to a man's suspenders, or belt, and would be accessible at all times. Also, the smaller carriers would enable one to extend the antenna on the phone, if necessary, without removing the phone from the carrier, and without contacting the body of the wearer.

Several carriers, of different configurations, are shown in the patented U.S. prior art.

To illustrate, U.S. Pat. No. 4,771,927, granted Sep. 20, 1988 to Mario A. Ventura, discloses a phone holder (10), connectable around the mid-portion of a cordless telephone handset (H), including an elongated flexible strap (12) having mating Velcro-type interconnecting members (16, 18) at each end for retaining the strap securely in place around the handset. A support clip (14) is connected to the strap for retaining the handset to the user's waistband, as shown in FIG. 2.

U.S. Pat. No. 5,653,336, granted Aug. 5, 1997, to Erik Buonaiuto et al, discloses embodiments of an upwardly opening receptacle (10) for holding a cellular phone. FIGS. 1 and 3 show the receptacle with slots (20, 22) in the rear face to allow the receptacle to be positioned on suspender strap (48), as shown in FIG. 5. Loop (24), and fasteners (26, 28), enable the receptacle to be secured to the clothing of the wearer; and the receptacle may be sealed by folding flap (36) on top cover panel (34) over the open, upper end of the receptacle, as shown in FIG. 4. A side assembly (39), including a horizontal strap (40) cooperates with the suspender assembly, and positions the receptacle (10), as shown in FIG. 6.

U.S. Pat. No. 5,957,357, granted Sep. 28, 1999, to Robert Kallman, discloses a receptacle (1) for holding objects, such as a cellular phone (8). The receptacle opens upwardly, and is retained in vertical position on a belt (7), by a split V-shaped strap (4), an encircling strap (5), and a rear strap (10).

U.S. Design Pat. No. Des 284,372, granted Jun. 24, 1986 to Lowell Carpenter, depicts an upwardly opening carrying case for a cellular phone. Slots are formed in the surface of the case, and a clip is situated between the slots. The carrying case can be secured to the belt of the wearer, or user.

While the foregoing carriers functioned satisfactorily for their intended purposes, certain shortcomings were observed. For example, some of the carriers assumed the form of upwardly opening receptacles; thus, the cellular phones could easily fall out of the carrier, or the phone could be pilfered.

Conventional carriers are of fixed dimensions, and thus are not suitable for use with different phones with different shapes and dimensions. Additionally, known carriers are operational in only one particular orientation, either horizontally or vertically oriented, and, in some instances, are bulky, rigid, and uncomfortable when worn on the body.

The present invention is directed to a versatile carrier for portable cellular phones, such carrier being secured to the body of the user in either a horizontal or vertical orientation. The carrier can be worn on a belt, on a pair of suspenders, on the strap of a hand bag, travel bag, garment carrier, knapsack, or the like. The carrier is formed with an expandable panel or band, so that telephones, or other appliances of different sizes and shapes can easily be accommodated. Also, the carrier utilizes an elongated tongue with cooperating hook and eye fasteners, such as Velcro® fasteners, to securely retain the phone or other appliance, within the receptacle, regardless of the orientation of the carrier.

SUMMARY

In order to obviate the deficiencies attributable to known carriers for cellular phones and similar appliances, the instant invention provides a versatile, inexpensive carrier, capable of retaining cellular phones, or the like, in two operative position(s) on the body of the user. The carrier is formed of fabric components sewn together along with an expandable panel, that yields to accommodate cellular phones of different dimensions from diverse manufacturers. The fabric is washable, easily cleaned, durable, and odor-free.

The instant invention contemplates a carrier with an integrally formed elongated locking tongue that fits over the open, upper end of the body of the carrier. A strip of resealable fasteners on the underside of the tongue cooperates with a complementary strip of fasteners on the front of the carrier to secure the cellular phone therewithin. The carrier has reinforced seams for increased strength. An access opening in the lower face of the carrier allows the phone to be plugged into a re-charger and other accessories, when necessary.

The instant invention further envisions a carrier comprising an upwardly opening body, of generally rectangular configuration, with a first strip of resealable fasteners on its back surface, or panel, and a second, parallel strip of resealable fasteners on its adjacent side panel. A pivotable closure flap, is sewn to one edge of the back surface of the carrier. Third and fourth strips of resealable fasteners, are situated near the free end of the closure flap, on its interior surface.

The closure flap is pivoted about its fixed edge, or axis, so that the third and/or fourth strips of resealable fasteners engages either the first and/or the second strips thereby pressing the supporting strap against the rear surface of the carrier. Hook and loop fasteners, such as those sold under the mark VELCRO®, are preferred for use as the complementary resealable fasteners.

The closure flap may be pivoted about a belt, suspender strap, or a shoulder strap on a hand bag, shoulder bag, garment bag, knapsack, or the like, to fixedly secure the carrier to such item. The selective engagement of the fastener strips on the underside of the closure flap with the first, and/or the second, strip of resealable fasteners on the expandable side panel and the rear panel of the body of the carrier, allows the carrier to be oriented in a horizontal or vertical orientation. The closure flap, once secured, locks the carrier in a fixed position, regardless of the width of the supporting strap, so that the carrier does not slide along the suspender, belt, strap, etc., to which it is attached. The closure flap may include a fold used between the pair of fastener strips, so that the closure flap closely conforms to the shape of the body of the carrier, and enhances the locking action.

Other advantages attributable to the versatile instant carrier will become apparent to the skilled artisan when the appended drawings and ensuing specification are construed in harmony.

DETAILED DESCRIPTION OF THE INVENTION

Figure 1:
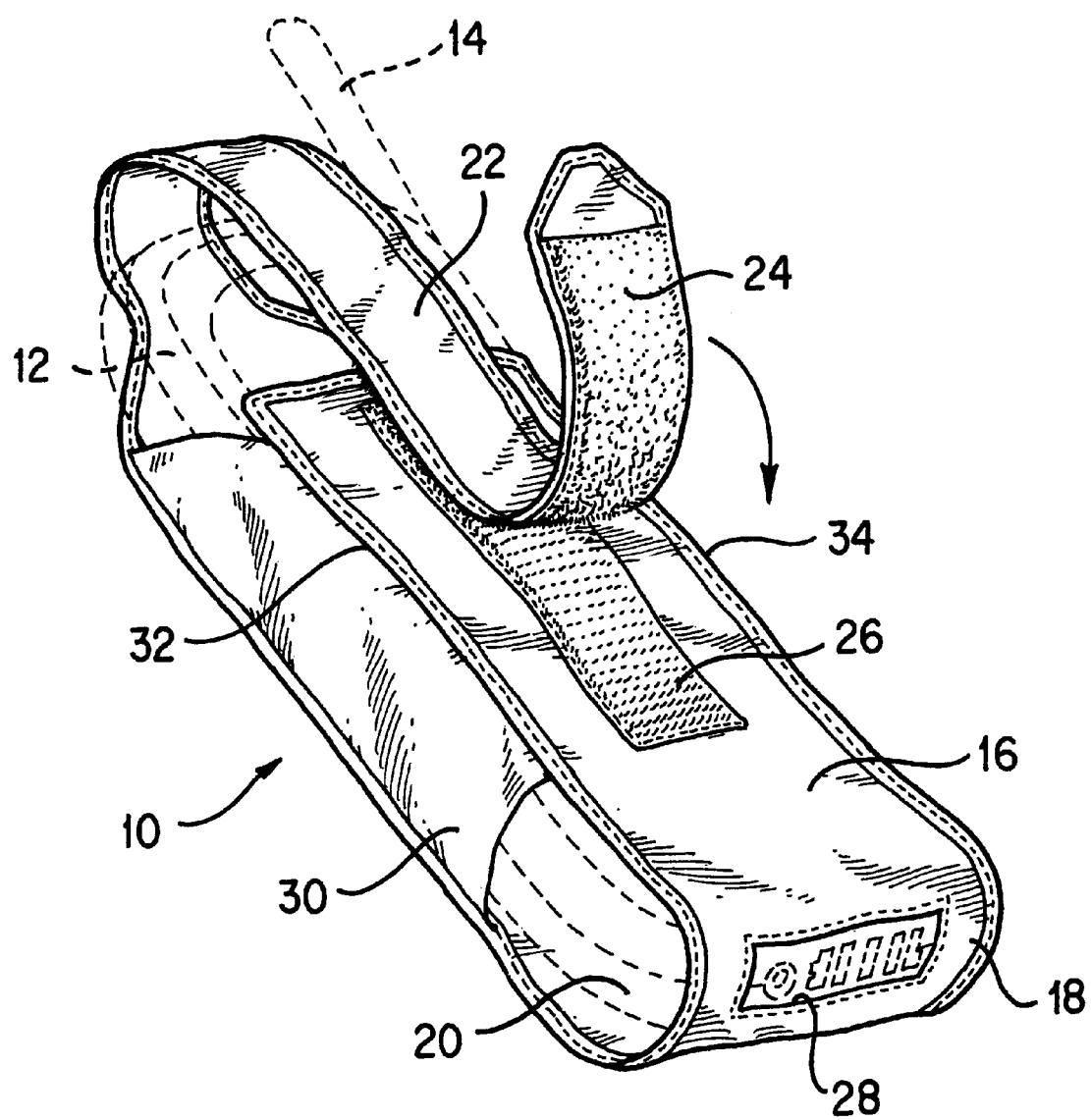
FIG. 1 is a perspective view of the front of a carrier, constructed in accordance with the principles of the instant invention, such view showing the locking tongue closing the open upper end of the body of the carrier.

FIG. 1 shows the unique carrier 10, constructed in accordance with the principles of the instant invention, from a light weight, durable, washable fabric or mesh. A cellular phone 12 with an extensible antenna 14 (shown in phantom outline) is retained within the carrier 10. Carrier 10 includes front panel 16, bottom panel 18, rear panel 20, and elongated locking tongue 22. The several components of the carrier are sewn together to form as integral member. Locking tongue 22 folds over the open, upper end, or mouth, of carrier 10 and a resealable fastener strip 24 on the underside of tongue 22 engages a complementary, resealable fastener strip 26 on front panel 16 of carrier 10. Tongue 22 secures phone 12 within the carrier, in an upright, operative position. An access opening 28 in the bottom panel 18 allows phone 12 to be plugged into a recharger and other accessories (not shown).

An expandable side panel 30, joins panels 16, 20 together; the panel may be formed of a resilient material that yields elastically to accommodate cellular phones from diverse manufacturers, with different configurations, enhance the versatility of carrier 10. A similar side panel 32, not visible in FIG. 1, but shown in FIGS. 2 and 3, extends along the opposite side of carrier 10, to complete an upwardly opening, substantially rectangular carrier. The front, rear and side panels are sewn together along reinforced edges 34 to preclude fraying of the carrier.

Figure 2:
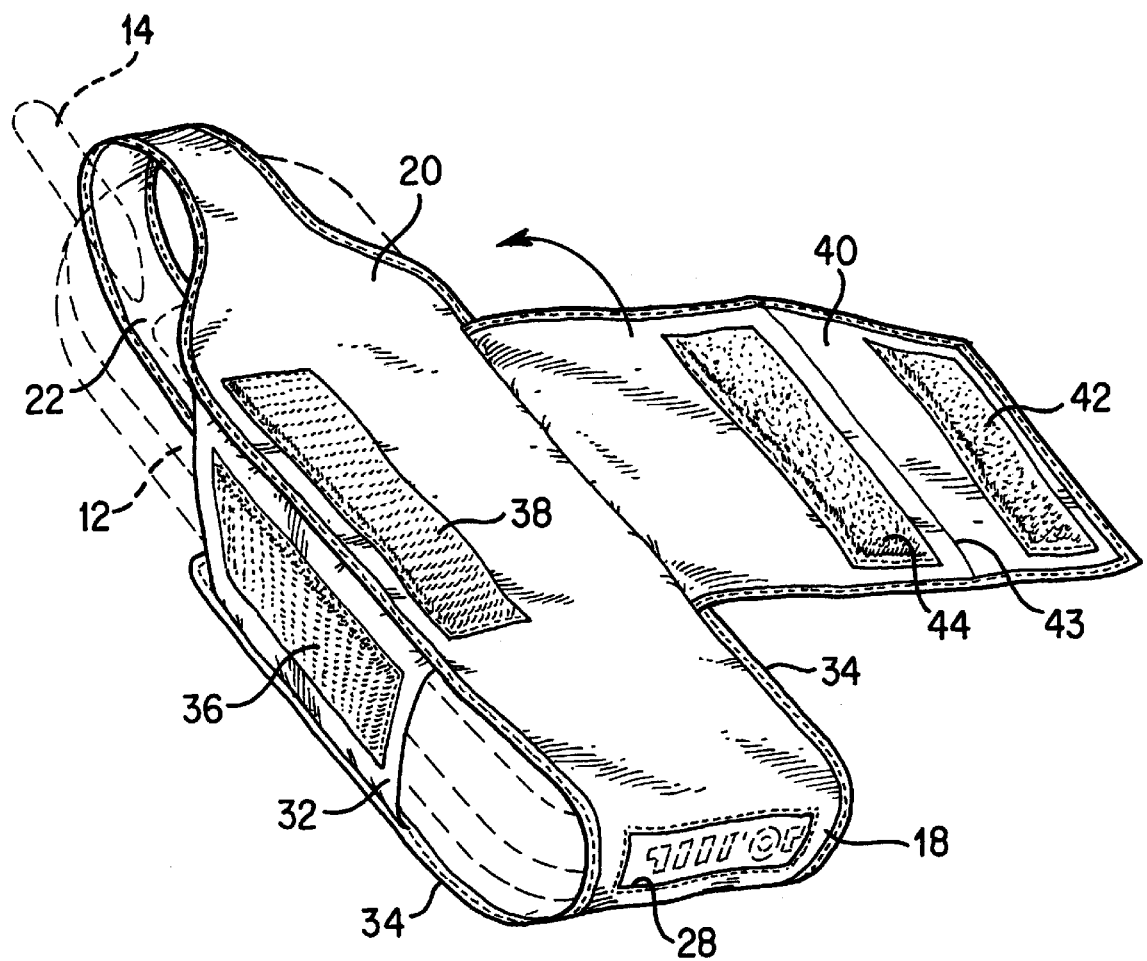
FIG. 2 is a perspective view of the rear of the carrier constructed in accordance with the principles of the instant invention, such view showing the closure flap extending outwardly from the body of the carrier.

FIG. 2 shows side panel 32, which joins panels 16, 20, together; side panel 32 is parallel to panel 30, and is also sewn into position along reinforced edges 34. A resealable fastener strip 36 extends longitudinally along panel 32. Another resealable fastener strip 38, of similar size and shape, extends along rear panel 20. Closure flap 40 is secured to the body of carrier 10 along reinforced edge 32, so that the free end of the flap can be pivoted relative to the body of the carrier. Resealable fastener strips 42, 44 are secured to the inner face of flap 40. Crease, or fold line 43, separates the fastener strip 42 from fastener strip 44.

Figure 3:
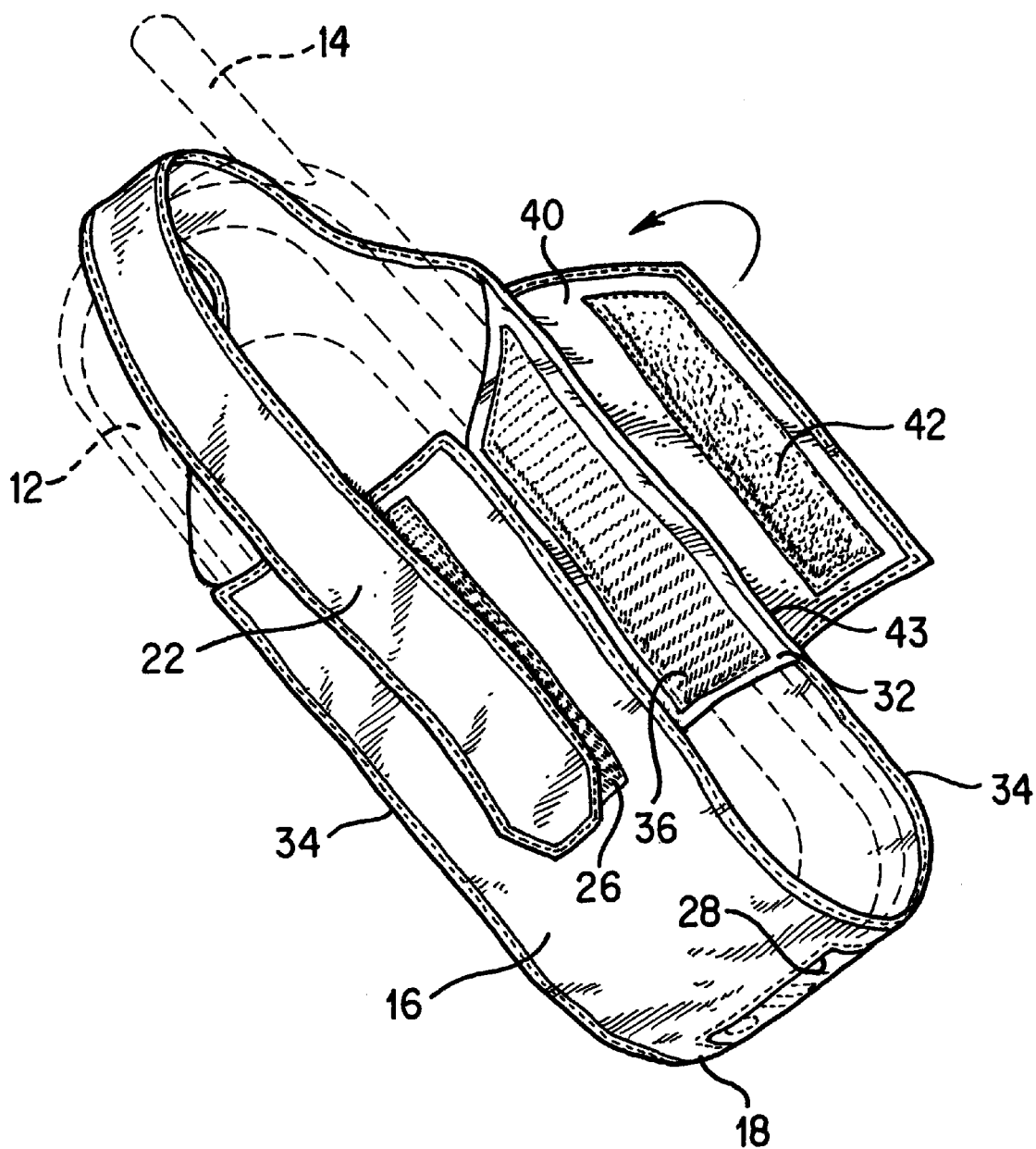
FIG. 3 is a perspective view of the front of the carrier, with the locking tongue fully engaged and the closure flap being pivoted toward the fastener strips on the body of the carrier.

FIG. 2 shows closure flap 40 in its extended position, prior to securing carrier 10 in position upon a belt, straps, suspender, or the like. In contrast, FIG. 3 shows closure flap 40 being pivoted toward locked position, as indicated by the directional arrow. Closure flap 40, with its resealable fastener strips 42, 44, functions in the following manner. If the carrier 10 is to be secured about a suspender strap or about a strap on a handbag, shoulder bag, etc., in a vertical position, the strap must be trapped between the underside of flap 40 and rear panel 20 of carrier 10. To achieve such a firm grip on the strap, at least one of the fastener strips 42, 44 must be pressed into secure engagement with complementary resealable fasteners strip 36 and/or 38 on rear panel 20 and side panel 32. Fold line 43 assists in properly locating the fastener strips on the closure flap to conform closely to the rectangular shape of the carrier, since fold line 43 aligns with the corner of the carrier defined between panel 20 and panel 32. Whereas it is desirable that the locking action be achieved by engagement of all four fastening strips, belts and straps come in different widths. Thus, in some instances, only one pair of fastening strips will be engaged, but nonetheless, the desired locking action is achieved.

If carrier 10 is to be worn in a horizontal orientation, the same relationships between the pairs of fastening strips prevail.

Figure 4:
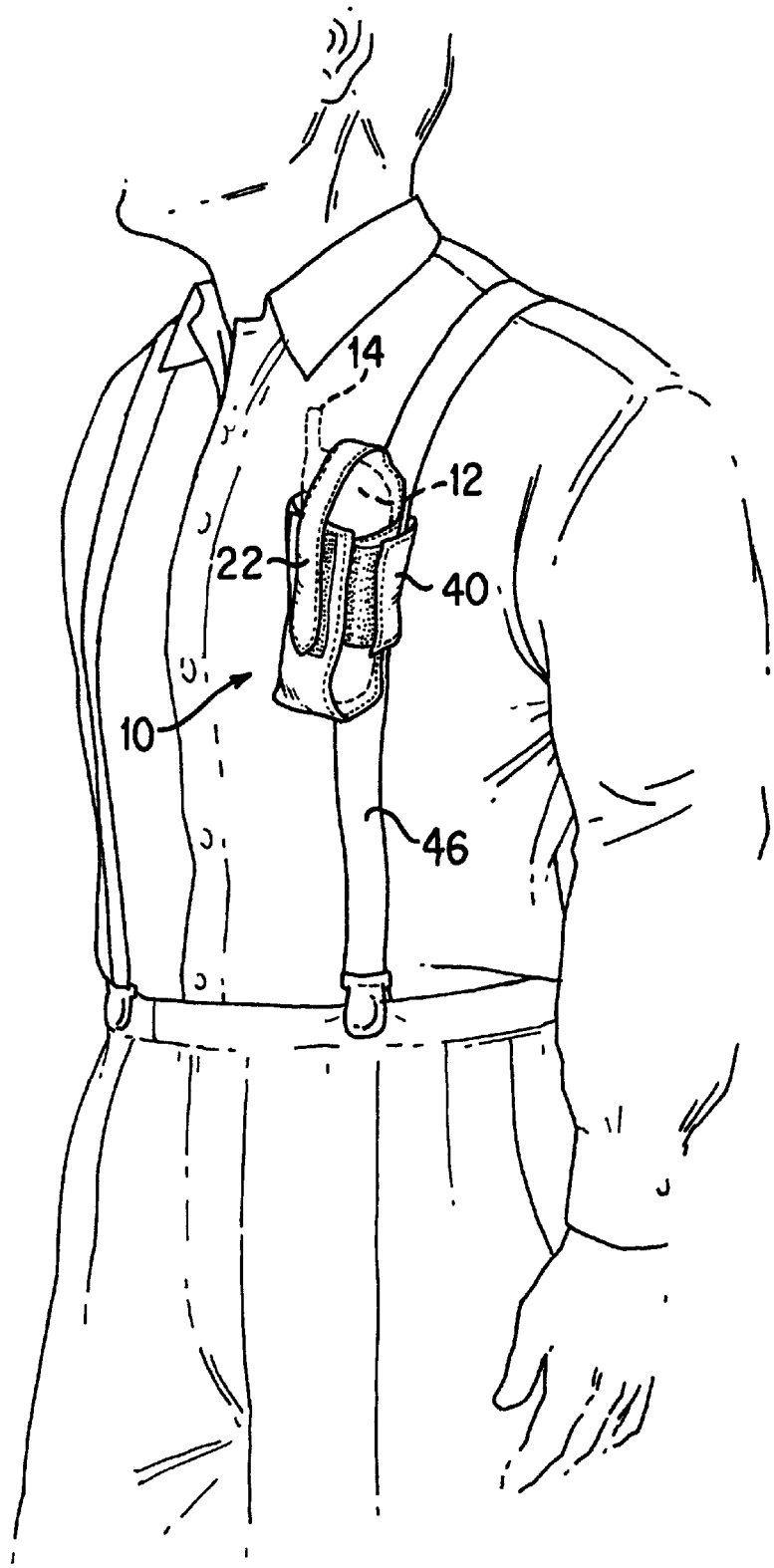
FIG. 4 is a perspective view of the carrier of FIGS. 1–3 secured to a suspender strap, the carrier being retained in a vertical orientation.

FIG. 4 shows carrier 10 worn in a vertical orientation on strap 46 of a pair of suspenders. Elongated locking tongue 22 is engaged over the open upper end of carrier 10 to retain cellular phone 12 with antenna 14 in its upright position. The antenna does not slip, or ride along, strap 46, for closure flap 40 has been pivoted into engagement with resealable fastener strips 36, 38 and traps, or presses, strap 46 against rear panel 20 of the carrier.

Figure 5:
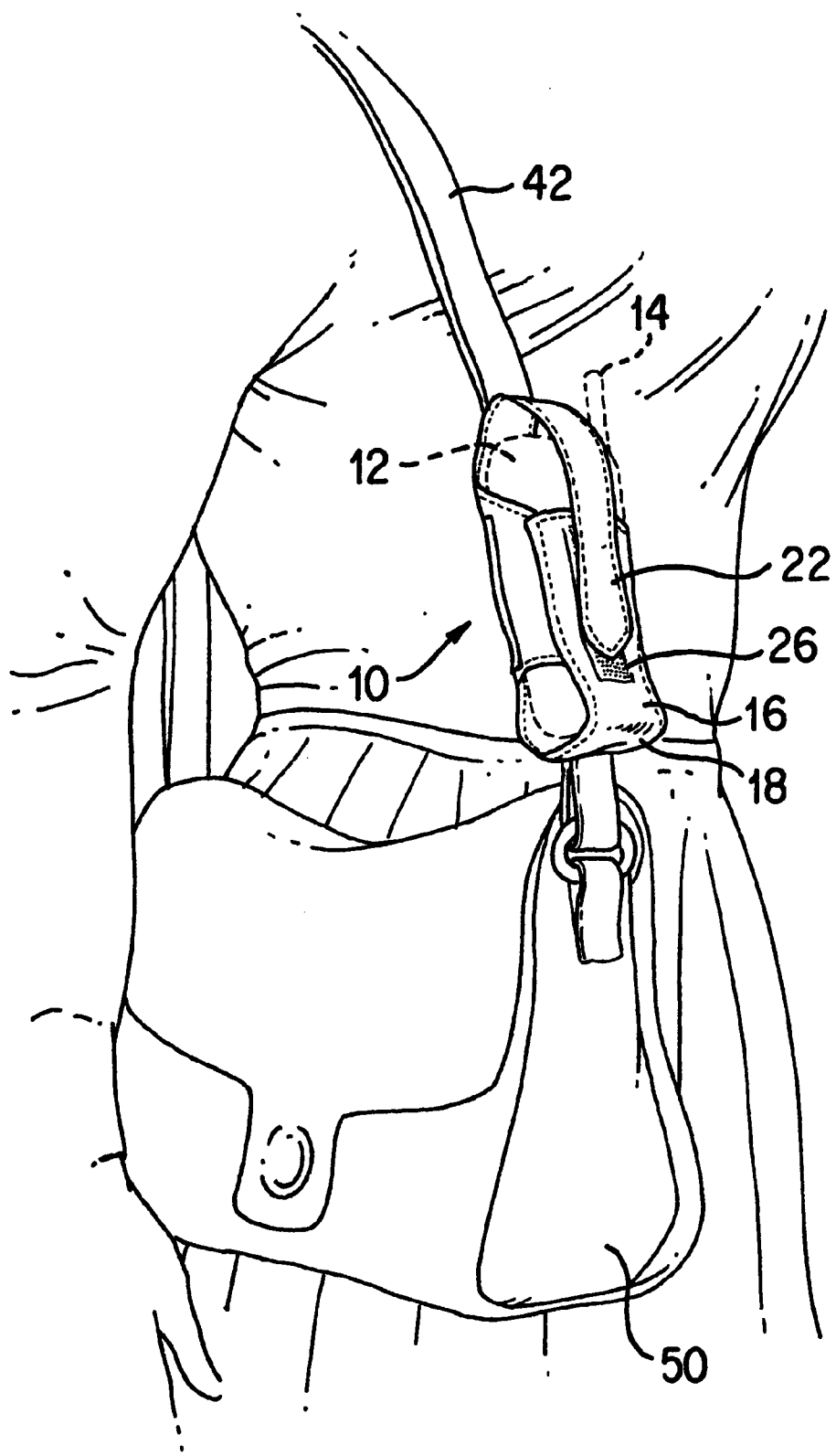
FIG. 5 is a perspective view of the carrier of FIGS. 1–3 secured to the strap of a shoulder bag, the carrier being retained in a vertical orientation.

FIG. 5 shows carrier 10 carried, or worn, in a vertical orientation on strap 48 of a woman's shoulder bag 50.

Figure 6:
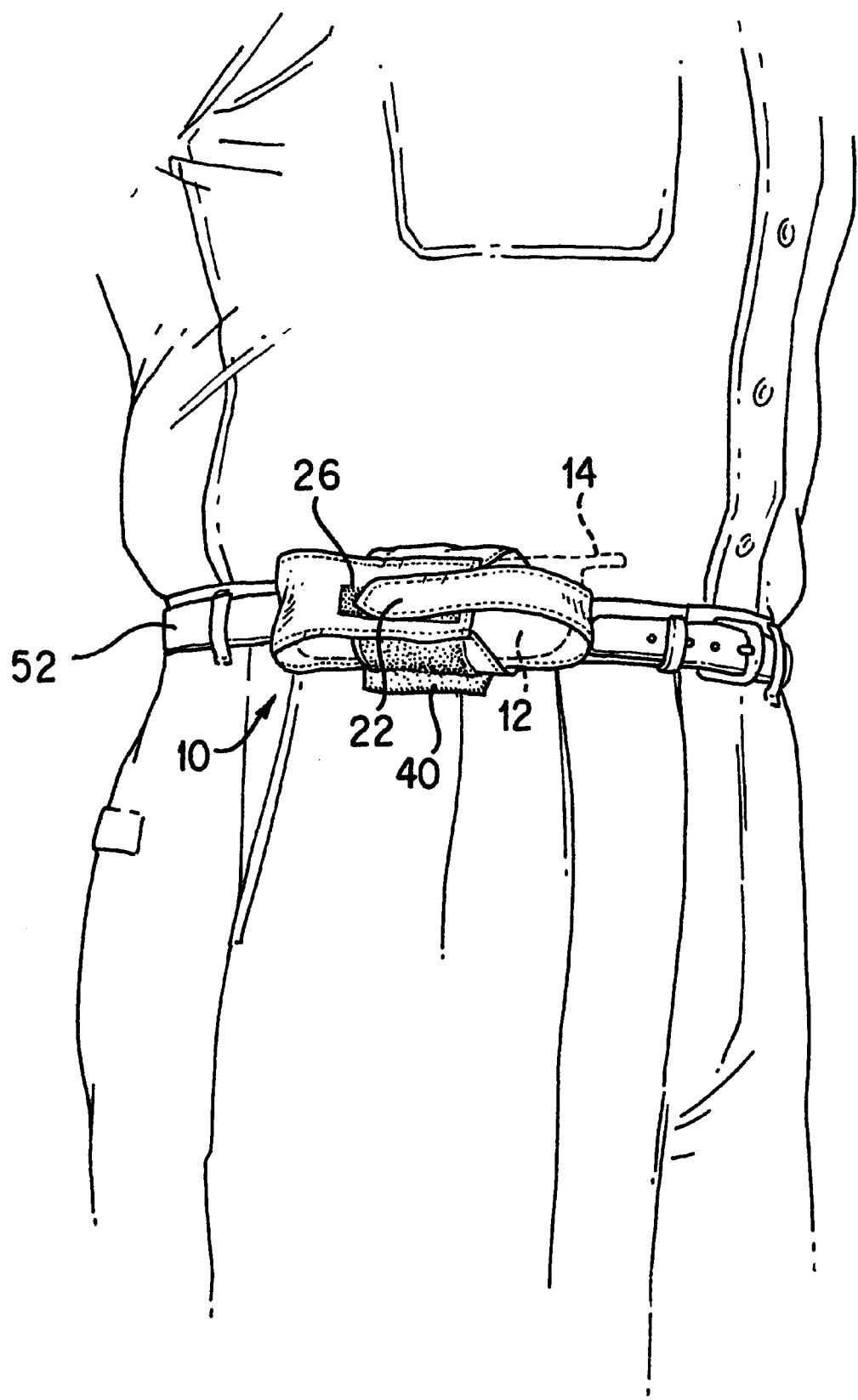
FIG. 6 is a perspective view of the carrier of FIGS. 1–3 secured about a belt, the carrier being retained in a horizontal orientation.

FIG. 6 shows carrier 10 worn on, or about, belt 52 on the waist of the wearer. Antenna 14 extends parallel to the body of the person wearing carrier 10, and does not interfere with the wearer.

The foregoing detailed description is illustrative in nature, and modifications or revisions may occur to the skilled artisan. While the instant carrier may find particular utility with cellular phones, the carrier may be used to transport hand held computers, such as the Palm Pilot®; cameras; glasses; coins; and cigarette lighters. Also, while the preferred embodiment of the invention relies upon hook and loop fasteners to serve as resealable fastener strips, other fasteners, such as snap fasteners, clips and snaps, might also be feasible. Also, only one fastener strip may be employed on the closure flap 20, and the complementary fastener strips need not be identical in size pr parallel in orientation. Expandable panel 30 might be replaced by a panel with a pleat, or several pleats, that could be extended, as needed. Consequently, the claims of record, capturing the spirit and scope of the invention, should be liberally construed, and should not be restricted to their literal terms.

I claim:

1. A versatile carrier for cellular telephones, said carrier comprising:

a) a body comprising a rear panel, a bottom panel, a front panel, and a pair of side panels secured together to define an upwardly opening receptacle adapted to receive a cellular phone, b) an elongated locking tongue extending from said rear panel over the opening in said receptacle and contacting the front panel of said carrier, c) complementary resealable fastener strips on said tongue and said front panel of said panel so that said tongue is secured to said front panel to retain a cellular phone within the carrier, d) a closure flap secured to said rear panel of said carrier for pivotal movement relative thereto, said closure flap including an inner face and an outer face, e) at least one resealable fastener strip secured to said inner face of said closure flap, f) a first complementary fastener strip secured to said rear panel of said body of said carrier, g) a second complementary fastener strip secured to one of said side panels in proximity to said first complementary fastener strip, and h) said closure flap being pivoted relative to said carrier body to bring said fastener strips into engagement to secure said carrier to a strap or belt, said strap being pressed against said rear panel of said body.

2. A carrier as defined in claim 1 wherein at least one of said side panels is formed of an elastic material that allows said carrier to accommodate cellular phones of different dimensions.

3. A carrier as defined in claim 1 wherein two parallel fastener strips are provided on the inner face of said closure flap.

4. A carrier as defined in claim 3 wherein a fold line in said closure flap is defined between said parallel fastener strips, said fold line enabling said parallel fastener strips to engage said complementary fastener strips on said rear panel and one of said side panels.

5. A carrier as defined in claim 4 wherein said fold line is aligned with the corner of the carrier defined by the intersection of one of said side panels and said rear panel, said fold line insuring that said closure flap conforms closely to body of said carrier.

6. A carrier as defined in claim 5 wherein the engagement of one of said fastener strips on said inner face of said closure flap with one of said fastener strips on said body of said carrier is sufficiently strong to retain said carrier in fixed position on a strap or belt.

* * * * *